United States Patent
Anderson

(10) Patent No.: US 9,900,046 B2
(45) Date of Patent: Feb. 20, 2018

(54) GENERATING A COMPOSITE SIGNAL WITH CODE DIVISION MULTIPLEXING (CDM) AND TIME DIVISION MULTIPLEXING (TDM) PILOTS

(75) Inventor: Nicholas William Anderson, Bristol (GB)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 929 days.

(21) Appl. No.: 13/131,675

(22) PCT Filed: Nov. 27, 2009

(86) PCT No.: PCT/EP2009/008474
§ 371 (c)(1),
(2), (4) Date: Nov. 10, 2011

(87) PCT Pub. No.: WO2010/060640
PCT Pub. Date: Jun. 3, 2010

(65) Prior Publication Data
US 2012/0044926 A1 Feb. 23, 2012

(30) Foreign Application Priority Data

Nov. 27, 2008 (GB) .................................. 0821745.7

(51) Int. Cl.
*H04B 7/216* (2006.01)
*H04B 1/707* (2011.01)
(Continued)

(52) U.S. Cl.
CPC ......... *H04B 1/707* (2013.01); *H04L 27/2607* (2013.01); *H04B 2201/70701* (2013.01); *H04J 13/0077* (2013.01); *H04J 13/20* (2013.01)

(58) Field of Classification Search
CPC ........ H04B 2201/70701; H04J 13/0077; H04J 13/20
(Continued)

(56) References Cited

U.S. PATENT DOCUMENTS 6,028,852 A 2/2000 Miya et al.
6,044,119 A 3/2000 Sato et al.
(Continued)

FOREIGN PATENT DOCUMENTS

EP 1734684 A1 12/2006
JP 9252266 A2 9/1997
(Continued)

OTHER PUBLICATIONS

"WCDMA for UMTS: Radio Access for Third Generation Mobile Communications," pp. 1-8 (Harri Holma & Antti Toskala eds., John Wiley & Sons, Ltd 2001).
(Continued)

*Primary Examiner* — Faisal Choudhury
(74) *Attorney, Agent, or Firm* — Volpe and Koenig, P.C.

(57) ABSTRACT

A composite signal may be generated with code division multiplexing (CDM) and time division multiplexing (TDM) pilots. A first pilot sequence may be a CDM pilot sequence. A second pilot sequence may have TDM pilot sequences including a cyclic prefix. The composite signal may have a cyclic prefix time domain portion based on the cyclic prefix and a base portion of the composite signal.

12 Claims, 12 Drawing Sheets

(51) Int. Cl.
*H04L 27/26* (2006.01)
*H04J 13/00* (2011.01)
*H04J 13/20* (2011.01)

(58) Field of Classification Search
USPC .......................................................... 370/342
See application file for complete search history.

(56) References Cited

U.S. PATENT DOCUMENTS

| | | | |
|---|---|---|---|
| 6,865,177 B1 | 3/2005 | Park et al. | |
| 7,016,690 B2 | 3/2006 | Corson et al. | |
| 8,135,088 B2 * | 3/2012 | Palanki | H04B 1/69 |
| | | | 375/295 |
| 2007/0195906 A1 * | 8/2007 | Kim | H04B 7/0671 |
| | | | 375/267 |
| 2007/0230511 A1 | 10/2007 | Feng et al. | |
| 2008/0101326 A1 * | 5/2008 | Zhang | H04W 56/0085 |
| | | | 370/345 |
| 2008/0205451 A1 * | 8/2008 | Ramesh et al. | 370/491 |
| 2008/0291972 A1 | 11/2008 | Chin Po Shin et al. | |
| 2009/0103497 A1 * | 4/2009 | Fernandez-Corbaton | H04B 1/707 |
| | | | 370/335 |
| 2009/0220021 A1 * | 9/2009 | Ihm et al. | 375/267 |
| 2009/0262699 A1 * | 10/2009 | Wengerter | H04L 1/0072 |
| | | | 370/330 |
| 2009/0325480 A1 * | 12/2009 | Ji | H04B 7/022 |
| | | | 455/8 |
| 2010/0027486 A1 * | 2/2010 | Gorokhov et al. | 370/329 |
| 2010/0124206 A1 * | 5/2010 | Bottomley | H04B 1/707 |
| | | | 370/336 |
| 2010/0208656 A1 | 8/2010 | Oh | |
| 2011/0292858 A1 * | 12/2011 | Jones et al. | 370/312 |

FOREIGN PATENT DOCUMENTS

| | | |
|---|---|---|
| JP | 10-122754 | 9/1998 |
| JP | 2003-500893 | 1/2003 |
| JP | 2006-519557 | 8/2006 |
| WO | 2004/102816 A2 | 11/2004 |
| WO | 2006/096784 A1 | 9/2006 |
| WO | 2006/138206 A1 | 12/2006 |
| WO | 2007/024853 A2 | 3/2007 |
| WO | 2008/045980 A2 | 4/2008 |

OTHER PUBLICATIONS

Third Generation Partnership Project, "Technical Specification Group Radio Access Network; Introduction of the Multimedia Broadcast Multicast Service (MBMS) in the Radio Access Network (RAN); Stage 2 (Release 8)," 3GPP TS 25.346 v8.1.0, Mar. 2008.
Dong-Seog Han et al., "On the synchronization of MC-CDMA system for indoor wireless communication", Vehicular Technology Conference, 1999, vol. 2, Sep. 19, 1999, pp. 693-697, SP010353144, IEEE VTS 50th Amsterdam, Netherlands, Sep. 19-22, 1999, Piscataway, NK, USA, IEEE, US.
International Search Report and Written Opinion for PCT/EP2009/008474 dated Apr. 4, 2011.
Office Action, Japanese Patent Application No. 2011-537894, dated Dec. 26, 2012.
Office Action, Japanese Patent Application No. 2011-537894, dated Apr. 25, 2013.

* cited by examiner

GENERATING A COMPOSITE SIGNAL WITH CODE DIVISION MULTIPLEXING (CDM) AND TIME DIVISION MULTIPLEXING (TDM) PILOTS

CROSS REFERENCE TO RELATED APPLICATIONS

This application is a national phase application of International Application No. PCT/EP2009/008474,filed Nov. 27, 2009, claiming priority to Great Britain Application No. 0821745.7, filed Nov. 27, 2008, both of which are incorporated by reference herein in their entirety.

FIELD OF THE INVENTION

The invention relates to employing a pilot transmission scheme in a communication system and in particular, but not exclusively, to employing a pilot transmission scheme in a broadcast $3^{rd}$ Generation Partnership Project (3GPP) cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. There may also be a time division multiple access (TDMA) component in CDMA systems, where user separation is also achieved by assigning different time slots to different users.

In FDD systems, uplink and downlink communication occur on separate carriers. Uplink transmissions are those from the mobile wireless communication unit (often referred to as wireless subscriber communication unit) to the communication infrastructure via a wireless serving base station. Downlink transmissions are those from the communication infrastructure to the mobile wireless communication unit via a serving base station. In contrast to FDD systems, TDD systems use the same carrier frequency for both uplink and downlink transmissions. In both FDD and TDD systems, the carrier frequency may be subdivided in the time domain into a series of timeslots in order to provide a TDMA component. For TDD, the single carrier frequency is assigned to uplink transmissions during some timeslots and to downlink transmissions during other timeslots. For FDD, a carrier frequency operable in either uplink or downlink mode may service different users during different time regions, which may comprise one or more timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In a conventional cellular system, cells in close proximity to each other are allocated non-overlapping transmission resources. For example, in a CDMA network, cells within close proximity to each other are allocated distinct spreading codes (to be used in both the uplink direction and the downlink direction). This may be achieved by, for example, employing the same channelisation spreading codes at each cell, but a different cell specific scrambling code. The combination of these leads to effectively distinct spreading codes at each cell.

A typical and most cost-effective approach in the provision of multimedia services is to 'broadcast' (point-to-multipoint transmission) the multimedia signals, as opposed to sending the multimedia signals in an uni-cast (i.e. point-to-point) manner. For broadcast point-to-multipoint transmission, a single carrier frequency conveys broadcast information to a plurality of wireless subscriber units from one wireless serving communication unit, i.e. one cell. Typically, tens of channels carrying say, news, movies, sports, etc. may be broadcast simultaneously over such a communication network. Conversely, for uni-cast operation, the communication is on a one-to-one basis between a wireless subscriber unit and a serving wireless communication unit, i.e. the information conveyed is unique to one wireless subscriber unit.

In some cases, an entire carrier may be dedicated to the sending of broadcast or point-to-multipoint information. The broadcast carrier may be associated with one or more uni-cast communication channels, which may be operable over one or more separate carrier frequencies. Additionally, it is possible for both uni-cast and point-to-multipoint broadcast traffic to be conveyed over the same carrier frequency but typically at different times. In general, uni-cast communication may allow for the establishment of security and authentication mechanisms related to the communication of the broadcast information between a wireless subscriber unit and a communication network, and may also facilitate the transfer of broadcast service information to the wireless subscriber unit. Other user-specific communication may be performed over the uni-cast carrier(s), which may or may not relate to the operation of broadcast services on the same or another carrier frequency.

Digital communication systems may use so-called non-coherent or coherent signalling methods. For either method, it is common that the transmitting entity maps the desired bit sequence for transmission onto a sequence of modulation symbols, each adopting one of a finite alphabet of symbols or waveforms. As the signals propagate from the transmitter to the receiver, the phase of the transmitted signal varies in space and in time. Generally, at a receiver, the phase of the received signal is arbitrary.

In the non-coherent method, the receiver does not require knowledge of the phase of the received signal in order to demodulate the signal and to recover the transmitted data. That is, the members of the transmitted symbol alphabet for the non-coherent modulation scheme may be distinguished from one another by the receiver without the need for absolute phase information.

Conversely, for coherent modulation schemes, members of the transmitted symbol alphabet may appear similar to one another at different phases. Thus, for these schemes, it is imperative that the receiver is able to determine the received phase of the signal in order to distinguish between the received symbols and to correctly recover the data. In many circumstances, coherent modulation schemes are able to carry spectral efficiency advantages. Hence, coherent modulation schemes are commonly used for high-capacity digital communication and broadcast systems.

In the coherent scheme, the transmitter often sends a reference signal along with the transmitted data. The receiver has a-priori knowledge of the structure of this reference signal. Hence, the receiver is able to look for the presence of the reference signal within the received signal. Upon finding the reference signal, the receiver may determine its amplitude and phase and, assuming that both the reference signal and the communication data have passed through the same propagation channel between transmitter and receiver, the phase of the additionally received communication data symbols is then also known and the modulation symbols may be recovered. The process of estimating the amplitude and phase of the radio propagation channel in the receiver is known as 'channel estimation'.

The reference signal is often referred to as a 'pilot'. At the transmitter, the pilot must be multiplexed with the data in some way such that both may then be carried over the communication link to the receiver, with the intention of ensuring that both will experience the same or similar phase adjustments by the time that the signals arrive at the receiver. Code-Division Multiplexing (CDM), Frequency-Division Multiplexing (FDM) and Time-Division Multiplexing (TDM) methods are each individually used in various communication systems to transmit pilot signals as well as data.

FIG. 1 illustrates examples of these pilot/data multiplexing possibilities. For example, a first graph 100 illustrates a CDM technique with the code values 115 plotted against time. Here, it is shown that the data is sent using a first set of codes and the pilot signal is sent using a second or second set of codes. A second graph 150 illustrates a TDM technique with a code or frequency 155 plotted against time. Here, the data 165 is sent in a first time period with the pilot signal 170 sent in a second time period.

The current UMTS WCDMA FDD system utilises CDM between the pilot signal and the data. The pilot is termed the Common Pilot Channel (CPICH). The CPICH is designed such that it is orthogonal in the code domain to the data. This helps to reduce interference between the data and pilot signal, which is beneficial in terms of receiver performance. The presence of code-domain orthogonality between the pilot signal and data helps to avoid the possibility of the data signal interfering with the pilot, which would otherwise reduce the quality of the estimate of the amplitude and phase of the pilot. This means that the characteristics of the radio propagation channel can be better-ascertained by the receiver and demodulation performance is improved (such as through a reduced number of communication errors, improved geographical coverage of the system, improved communication data rates, etc.).

The code-domain orthogonality between the pilot and data is present at the transmitting side, but can sometimes be degraded or destroyed by the time that the signals arrive at the receiver. This degradation is often due to the action of the intervening radio propagation channel. In particular, radio channels with a large amount of signal dispersion may significantly degrade the degree of orthogonality between pilot and data using a CDM technique. An example of this signal dispersion (a spreading in time of the signal energy due to multiple reflections and the differing path lengths of individual propagation rays) is illustrated in the time dispersion graphical representation 200 of FIG. 2. Thus, as shown, in some radio environments, a code domain pilot is susceptible to the radio propagation channel and exhibits a variable channel amplitude (and also phase—not explicitly shown) response 210 over time 215. As such, the use of CDM pilot signals can be less effective than would be desirable.

In such scenarios, it can be beneficial to alternatively utilise time division multiplexing for the pilot signal and data. Orthogonality between the pilot signal and the data is again susceptible to degradation due to the overlap of energy between the two, which is caused by the delay spread in the radio propagation channel. Referring back to FIG. 1, the time dispersion of data 175 in the radio channel may lead to a time domain overlap of energy between data and pilot signals. In the subsequent region 180, the pilot signal is not affected by the data even in the presence of dispersion, due to the time limitation of the imposed dispersion. Hence, the quality of the channel estimation is not degraded if this portion of the pilot signal is used for channel estimation.

Therefore, by allowing for some guard separation in the time domain between the pilot signal and data, or by careful design of the TDM pilot sequence, it is still possible to receive a portion of the TDM pilot that is unaffected by the data (and vice versa). Such careful design may ensure accurate estimation of the amplitude and phase of the radio channel using the TDM pilot as well as deliver an improved demodulation performance. As previously stated, these improvements in demodulation performance may be translated into system gains such as improved geographical coverage or increased data rates.

Large amounts of signal dispersion can occur due to the presence of multiple reflections in the radio channel. Larger differential path delays lead to a larger extent in time of the dispersion whilst the presence of multiple reflectors leads to an increased number of components (more paths). Such channels are referred to herein as 'complex' radio channels in that they may exhibit a large number of reflections.

One particular scenario where complex radio channels may be observed is that of the Single Frequency Network (SFN) transmission method for broadcast. In this transmission method, the same data is transmitted using the same signal waveforms from multiple transmission sites (i.e. multiple communication units) in a synchronised manner. The waveforms travel towards the (potentially mobile) receiver (i.e. wireless subscriber unit) and experience differing delays and amplitude and phase adjustments as they do so. The signals combine in space sometimes constructively and sometimes destructively. The presence of differing signal delays can allow for signals with a path delay difference to be resolved and constructively combined by the receiver. This process is often referred to as equalisation. Accurate channel estimation is therefore essential in such systems and environments to enable the constructive combination of the signals from the multiple transmission sites. In the absence of equalisation, the presence of multiple path reflections may severely degrade the radio link quality.

Therefore, it has been determined that the use of a CDM pilot for systems (such as the aforementioned SFN broadcast system) may not be overly appropriate in complex propagation channels. The use of a TDM pilot may offer advantages in terms of channel estimation and receiver performance. However, many 3GPP receivers are designed to operate using CDM pilots (and may also use the pilot for purposes other than channel estimation in the receiver).

Consequently, current techniques are suboptimal. Hence, an improved mechanism to address the problem of pilot transmission schemes, for example over a broadcast cellular network, would be advantageous.

SUMMARY OF THE INVENTION

Accordingly, the invention seeks to mitigate, alleviate or eliminate one or more of the abovementioned disadvantages singly or in any combination.

According to aspects of the invention, there is provided, a cellular communication system, integrated circuits and communication units arranged to perform a methods of utilising a pilot transmission scheme in accordance with the concepts herein described.

In one aspect of the invention, a method of pilot-assisted data communication is described. The method may be applied to pilot-assisted data communication generated within one or more time slots used for data transmission. The method comprises transmitting a composite signal, where the composite signal comprises data, a first pilot sequence, such as a CDM pilot sequence, with non-cyclic properties that is transmitted over a designated or pre-defined time region of the one or more time slots and a second pilot sequence, for example a TDM pilot sequence, where the first pilot sequence and second pilot sequence are formed within the composite signal in substantially the same pre-defined time region of the one or more time slot. The second pilot sequence is arranged such that the composite signal exhibits a cyclic prefixed structure. In one optional embodiment the substantially simultaneous transmission of the first pilot sequence and second pilot sequence comprises overlapping time periods within the pre-defined time region.

In one optional embodiment the composite signal may be transmitted during a first prefix segment of the pre-defined time region may be substantially the same as the composite signal transmitted during a second base segment of the pre-defined time region. For example, in one optional embodiment, the first prefix segment may be copied from the second base segment.

In one optional embodiment the first pilot sequence may be code-domain orthogonal to the second pilot sequence.

In one optional embodiment a non-cyclic scrambling operation may be performed on the first pilot sequence and/or the second pilot sequence during the pre-defined time region.

In one optional embodiment the second pilot sequence may be comprised of a combination of pilot sequence fragments within a multiplexing logic unit.

In one optional embodiment the multiplexing logic unit may comprise the operations of CDMA spreading and/or code multiplexing.

In one optional embodiment the multiplexing logic unit comprises a frequency domain multiplexing operation.

In one optional embodiment the second pilot sequence may be constructed using a finite symbol alphabet, such as QPSK, 16-QAM, 64-QAM.

In one optional embodiment the second pilot sequence may be constructed using constant-amplitude symbols.

In one optional embodiment the first pilot sequence may be a portion of a common pilot channel of a 3GPP WCDMA UMTS system.

In one optional embodiment the second pilot sequence may be arranged in order to result in a substantially flat frequency-domain composition of the second 'base' time segment of the pre-defined time region of the composite signal.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a UMTS (Universal Mobile Telecommunication System) cellular communication system and in particular to a UMTS Terrestrial Radio Access Network (UTRAN) operating in any unpaired spectrum within a $3^{rd}$ generation partnership project (3GPP) system. However, it will be appreciated that embodiments of the invention are not limited to this particular cellular communication system, but may be applied to any communication system that utilizes or may be adapted to support a pilot transmission scheme.

Embodiments of the invention propose a pilot transmission scheme that comprises both a CDM pilot and a TDM pilot, with the system being designed to benefit from use of both the CDM pilot component and the TDM pilot component. Thus, in some legacy-based CDMA communication systems, existing CDM pilot structures may be retained to minimise disturbance to these parts of the design within a wireless subscriber unit or terminal. In addition, the ability to use legacy CDM pilot signals reduces a need to redesign parts of the receiver that manage CDM channel estimation.

Figure 1:
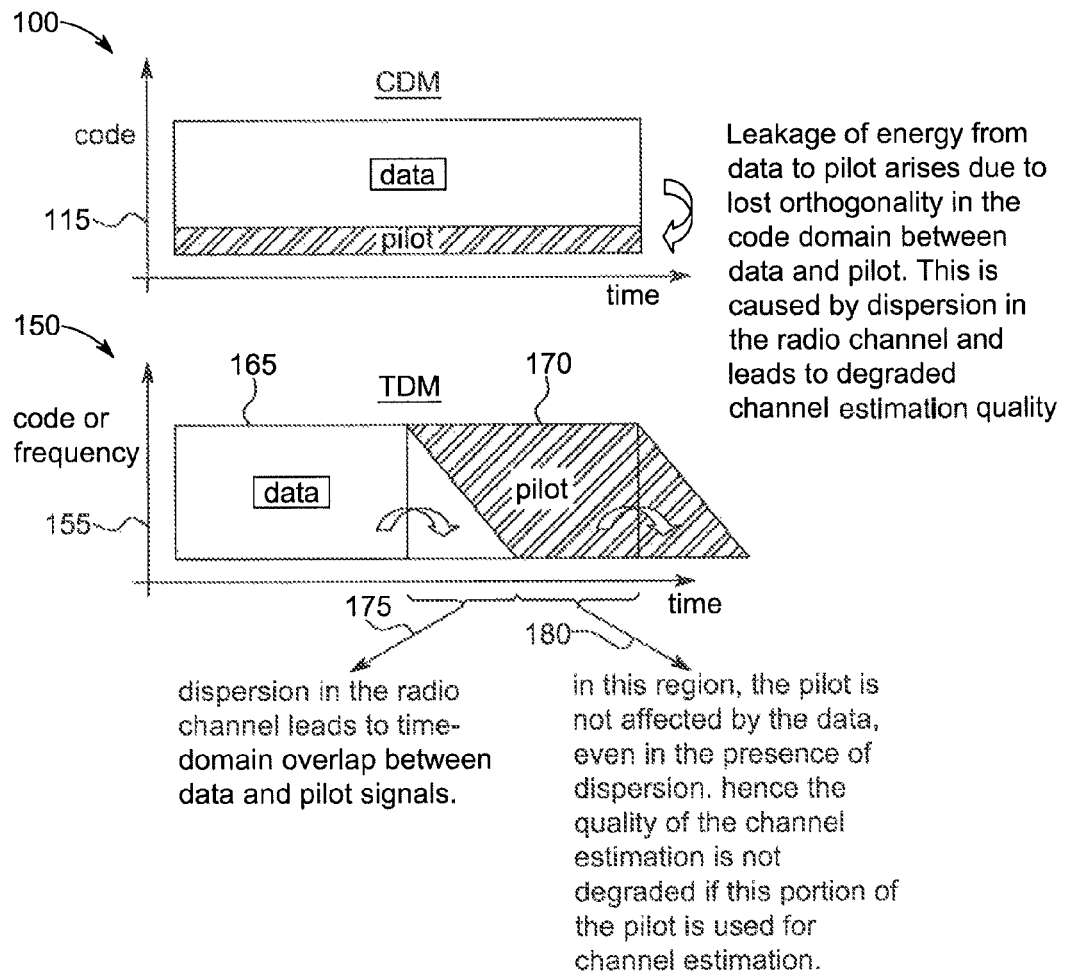
FIG. 1 illustrates an effect of time dispersion on CDM and TDM pilot multiplexing methods.
Figure 2:
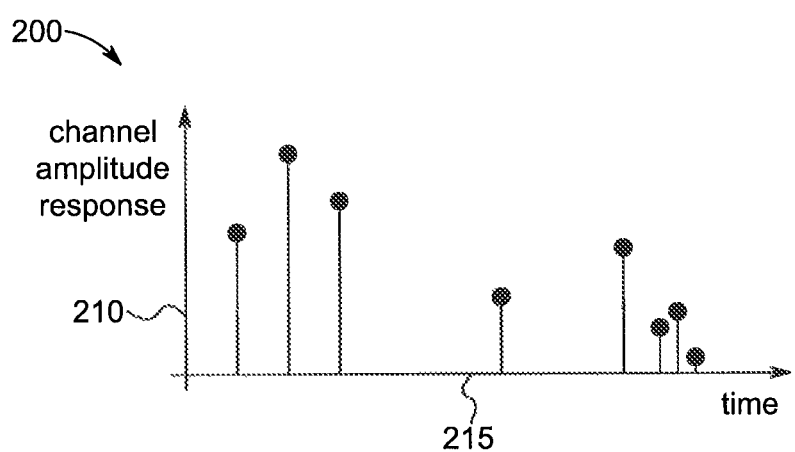
FIG. 2 illustrates the effect of time dispersion of a signal in a radio propagation channel.
Figure 3:
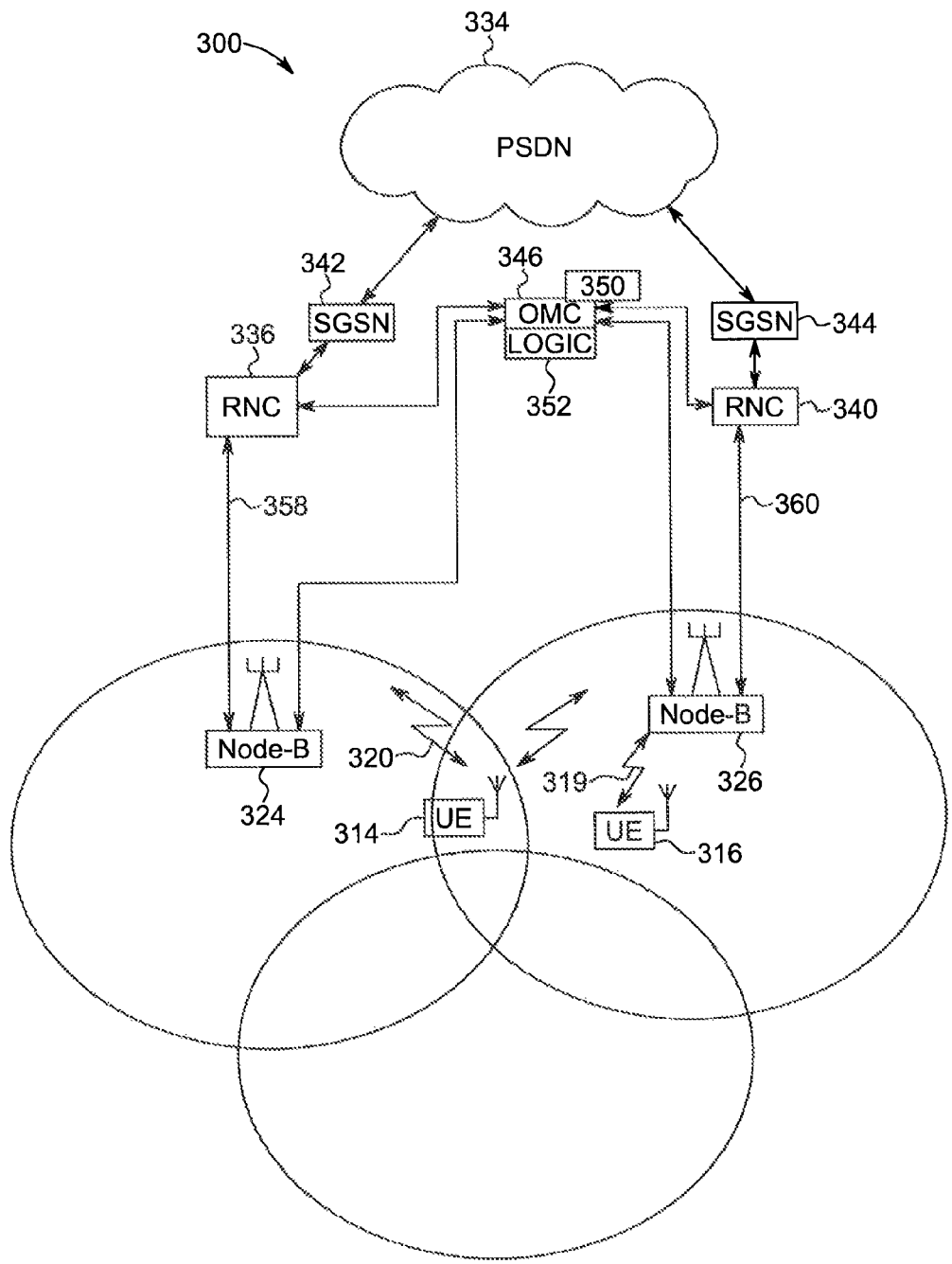
FIG. 3 illustrates a broadcast communication system adapted in accordance with some embodiments of the invention.

Referring now to FIG. 3, a cellular-based communication system 300 is shown in outline, in accordance with one embodiment of the present invention. In this embodiment, the cellular-based communication system 300 is compliant with, and contains network elements capable of operating over, an universal mobile telecommunication system (UMTS) air-interface. In particular, some embodiments relate to the Third Generation Partnership Project (3GPP) specification for wide-band code-division multiple access (WCDMA), time-division code-division multiple access (TD-CDMA) and time-division synchronous code-division multiple access (TD-SCDMA) standard relating to the UTRAN radio Interface (described in the 3GPP TS 25.xxx series of specifications).

In particular, the 3GPP system 300 is adapted to support both broadcast and uni-cast UTRA communication from one or more cells.

A plurality of wireless subscriber communication units/terminals (or user equipment (UE) in UMTS nomenclature) 314, 316 communicate over radio links 319, 320 with a plurality of base transceiver stations, referred to under UMTS terminology as Node-Bs, 324, 326. The system comprises many other UEs and Node-Bs, which for clarity purposes are not shown.

The wireless communication system, sometimes referred to as a Network Operator's Network Domain, is connected to an external network 334, for example the Internet. The Network Operator's Network Domain includes:

(i) A core network, namely at least one Gateway General Packet Radio System (GPRS) Support Node (GGSN) (not shown) and at least one Serving GPRS Support Nodes (SGSN) 342, 344; and (ii) An access network, namely:
(i) A UMTS Radio network controller (RNC) 336, 340; and
(ii) A UMTS Node-B 324, 326.

The GGSN (not shown) or SGSN 342, 344 is responsible for UMTS interfacing with a Public network, for example a Public Switched Data Network (PSDN) (such as the Internet) 334 or a Public Switched Telephone Network (PSTN). The SGSN 342, 344 performs a routing and tunnelling function for traffic, whilst a GGSN links to external packet networks.

The Node-Bs 324, 326 are connected to external networks, through Radio Network Controller stations (RNC), including the RNCs 336, 340 and mobile switching centres (MSCs), such as SGSN 344. A cellular communication system will typically have a large number of such infrastructure elements where, for clarity purposes, only a limited number are shown in FIG. 3.

Each Node-B 324, 326 contains one or more transceiver units and communicates with the rest of the cell-based system infrastructure via an $I_{ub}$ interface, as defined in the UMTS specification.

In accordance with embodiments of the invention, a first wireless serving communication unit (e.g. Node-B 326) has been adapted to comprise logic modules as shown in, and described with reference to, FIG. 4. In accordance with embodiments of the invention, a subscriber communication unit, such as a UE 314, has also been adapted to comprise logic modules as shown in, and described with reference to, FIG. 4.

For completeness, it is noted that each RNC 336, 340 may control one or more Node-Bs 324, 326. Each SGSN 342, 344 provide a gateway to the external network 334. The Operations and Management Centre (OMC) 346 is operably connected to RNCs 336, 340 and Node-Bs 324, 326. The OMC 346 comprises processing functions (not shown) and logic functionality 352 in order to administer and manage sections of the cellular communication system 300, as is understood by those skilled in the art.

Management logic 346 communicates with one or more RNCs 336, 340, which in turn provide the signalling 358, 360 to the Node-Bs and to the UEs regarding radio bearer setup, i.e. those physical communication resources that are to be used for broadcast and uni-cast transmissions.

The management logic 346 is operably coupled to broadcast mode logic 350. The broadcast mode logic 350 comprises or is operably coupled to signalling logic for signalling to the plurality of wireless subscriber communication units that part or all of the transmission resource in the cellular communication system 300 is to be configured or re-configured for broadcast mode of operation.

The broadcast mode logic 350 is configured to manage the physical resources that are signaled to the RNCs and the Node Bs. In this manner, the broadcast mode logic 350 allocates timeslots or carrier frequencies for broadcast, sets transit powers and allocates a cell IDs for all timeslots or carrier frequencies that are to carry broadcast transmissions.

Figure 4:
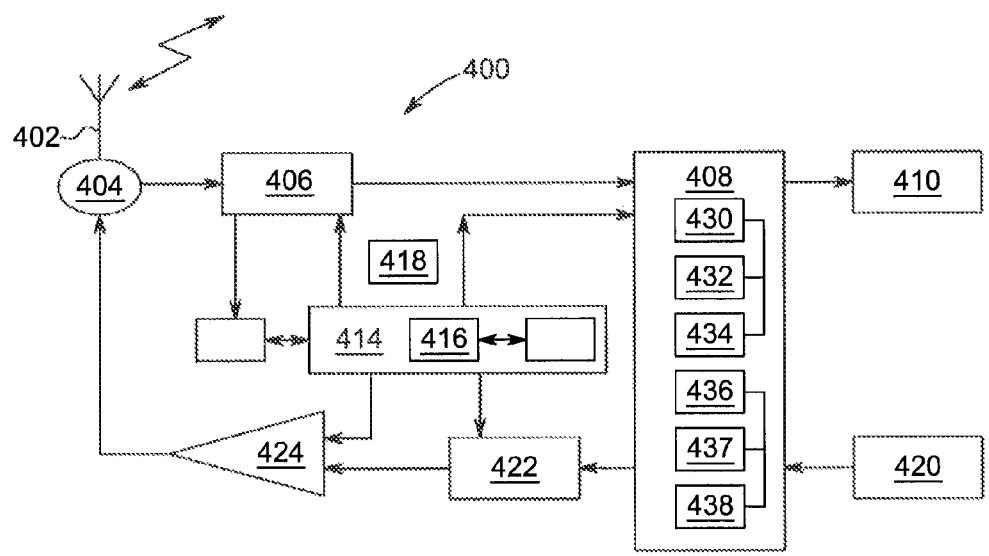
FIG. 4 illustrates a communication unit adapted in accordance with some embodiments of the invention.

Referring now to FIG. 4, a block diagram of a wireless communication unit 400 is shown and adapted in accordance with some embodiments of the invention. In practice, purely for the purposes of explaining embodiments of the invention, the wireless communication unit is described in terms of either a NodeB implementation or a user equipment (UE) implementation, with the functional elements being similar. The wireless communication unit 400 contains an antenna 402 coupled to antenna switch 404 that provides isolation between receive and transmit chains within the wireless communication unit 400.

The receiver chain, as known in the art, includes receiver front-end circuitry 406 (effectively providing reception, filtering and intermediate or base-band frequency conversion). The front-end circuitry 406 is serially coupled to a signal processing function 408. An output from the signal processing function 408 is provided to a suitable output device 410. A controller 414 maintains overall subscriber unit control. The controller 414 is also coupled to the receiver front-end circuitry 406 and the signal processing function 408 (generally realised by a digital signal processor (DSP)). The controller is also coupled to a memory device 416 that selectively stores operating regimes, such as decoding/encoding functions, synchronisation patterns, code sequences, direction of arrival of a received signal and the like.

In accordance with embodiments of the invention, the timer 418 is operably coupled to the controller 414 to control the timing of operations (transmission or reception of time-dependent signals) within the wireless communication unit 400.

As regards the transmit chain, this essentially includes an input device 420, such as a keypad, coupled in series through transmitter/modulation circuitry 422 and a power amplifier 424 to the antenna 402. The transmitter/modulation circuitry 422 and the power amplifier 424 are operationally responsive to the controller 414.

The signal processor 408 in the transmit chain may be implemented as distinct from the signal processor in the receive chain. Alternatively, a single processor 408 may be used to implement processing of both transmit and receive signals, as shown in FIG. 4. Clearly, the various components within the wireless communication unit 400 can be realized in discrete or integrated component form, with an ultimate structure therefore being an application-specific or design selection.

In accordance with embodiments of the invention, the signal processor 408 has been adapted to comprise logic (encompassing hardware, firmware or software) for supporting a combined pilot transmission scheme, dependent upon whether the wireless communication unit 400 is either a base station, say in a form of a NodeB or a wireless subscriber communication unit, say in a form of an UE.

For example, in a first embodiment, let us consider that the wireless communication unit 400 is a Node B. In a Node-B context, the signal processor 408 may be adapted to generate a combined TDM pilot and CDM pilot dependent upon any number of ways to generate a TDM pilot and combine the TDM pilot in a composite signal that includes a CDM pilot sequence. In this example embodiment, the signal processor 408 may comprise modulator logic 436, for example if the TDM pilot is constructed using the OVSF construction method (e.g. as described later with respect to FIG. 9D). In this example embodiment, a TDM pilot may be generated and introduced into the transmission stream using an existing modulator with a new set of modulated symbols (which may sometimes hereinafter be termed pilot sequence 'fragments'). The new set of modulated symbols may be introduced at the input of modulator logic 436 during a TDM pilot time region of one or more time slot, as will subsequently become apparent in later described embodiments. In embodiments of the invention, the composite signal is applied in a single time slot. However, in alternative embodiments, it is envisaged that the composite signal may be applied across multiple time slots. In yet further alternative embodiments, it is also envisaged that one time slot may be of variable length.

If the sequence conforms to existing modulation alphabets, it is envisaged in one example embodiment that any existing modulator logic in a legacy NodeB may not need adapting. However, if, in one example, a TDM pilot uses a modulation alphabet that is inconsistent with the modulation alphabet used by the data, then the modulator logic 436 may be replaced by symbol quantisation logic 437. The symbol quantisation logic 437 may be arranged to handle a new modulation alphabet (e.g. using different symbol quantisation) and may be located prior to a separate CDMA modulator (as shown in FIG. 9D) or prior to multiplexing logic (as shown in FIG. 9C). The symbol quantisation logic 437 may also be inserted in TDM pilot signal paths (pre scrambling, if applicable and as illustrated in FIG. 9A and FIG. 9B).

Furthermore, the NodeB signal processor may comprise adapted pilot generation logic 438. The pilot generation logic 438 may be arranged to be a separate logical entity handling generation of pilot waveforms (e.g. not using existing modulator logic). For example, in one embodiment, the pilot generation logic 438 may have been configured to handle the generation of a CDM pilot (e.g. a CPICH in a 3GPP system) in a legacy NodeB. In the adapted NodeB a TDM pilot may be introduced in a first example embodiment using a separate pilot generation logic (not shown) arranged to operate in parallel with distinct CDM pilot generation logic and arranged to generate the TDM pilot portion of the data transmission. In this embodiment, the outputs of the two pilot generation logic units would be summed. Alternatively, in a second example embodiment, an existing pilot generation logic/unit could be modified to generate a single combined CDM/TDM pilot waveform.

In a second embodiment, let us consider that the wireless communication unit 400 is a UE. In a UE context, the signal processor 408 may be adapted to generate a combined TDM pilot and CDM pilot dependent upon a number of ways to generate the TDM pilot. In one example embodiment, the signal processor 408 may comprise channel estimator logic 430. In an application that uses legacy UEs, there would generally be an existing channel estimator that is based around estimation using the CDM pilot (e.g. a CPICH in a 3GPP system). In a second UE-based embodiment, a TDM pilot component may alternatively be instantiated using a new TDM-pilot channel estimation unit, and optionally combine the TDM pilot and CDM pilot outputs to provide an improved combined channel estimate, as illustrated and described further with reference to FIG. 11.

Alternatively, in the second UE-based embodiment, an existing CDM pilot channel estimator may be modified to create a new single channel estimation logic/unit 432 that operates on all relevant parts of the received signal at its input. The derived channel estimates may be applied to an equalisation and data recovery block, for example as illustrated further with reference to FIG. 11.

Although embodiments of the invention are described with regard to a broadcast system, whereby a NodeB transmitter is adapted to transmit a transmission using a combined CDM pilot and TDM pilot, and a UE receiver is adapted to receive and process a transmission that uses a combined CDM pilot and TDM pilot, it is envisaged that the embodiments herein described are equally applicable to a uni-cast (point-to-point) system. Here, a UE may be additionally adapted to support a transmission using a combined CDM pilot and TDM pilot, with a NodeB receiver also being adapted to receive and process a transmission that uses a combined CDM pilot and TDM pilot from a transmitting UE.

In an alternative embodiment to the above direct channel estimation approach, it is envisaged that the TDM pilot and CDM pilot signals may be provided as inputs to adaptively-trained equaliser logic 434. In this alternative embodiment, which is further described in FIG. 11, the adaptively-trained equaliser logic 434 would previously have taken the known local replica of the CDM pilot as its input, to which the equalised pilot output of the adaptively-trained equaliser logic 434 is compared to form an error signal that drives the feedback via coefficient adaptation logic (not shown). When the TDM pilot is added, it is envisaged in one example embodiment that one adaptation logic unit may be retained (as there is still only one equaliser logic unit). However, it is also envisaged that the adaptation logic unit may be driven by a single error signal, or by two separate error signals.

In an embodiment where there are separate error signals, one error signal may be formed using a TDM pilot local replica, and one using a CDM pilot local replica. Pilot demultiplexing logic (not shown) may be used to separate the received and equalised pilots from the composite equalised signal. The pilot demultiplexing logic would typically consist of a matched filter (matched to the pilot), for example, or logic that extracts a particular pilot region of the received output.

In an embodiment that uses separate error signals, the pilot demultiplexing logic may be arranged to isolate the CDM portion and the TDM portion from the separate error signals respectively. Each of these separate outputs may be compared against their respective local replica's forming two error signals. In this example, these two error signals may be fed to the (single) adaptation logic that is arranged to then calculate new coefficients and apply them to the equaliser logic.

In an embodiment where there is a single error signal, the pilot demultiplexing logic may be arranged to produce a single composite output that is matched to the composite (TDM and CDM) equalised pilot signals. This may be compared against a composite (TDM and CDM) local replica and the resultant single error signal may be used to drive the equaliser adaptation process.

In a yet further embodiment of the invention, the channel estimation techniques described above may be combined with adaptive equaliser techniques. For example, it is envisaged that an adaptive equaliser technique may be used for the CDM pilot and the coefficient adaptation process may take account of an auxiliary channel estimate formed using the TDM pilot.

Figure 5:
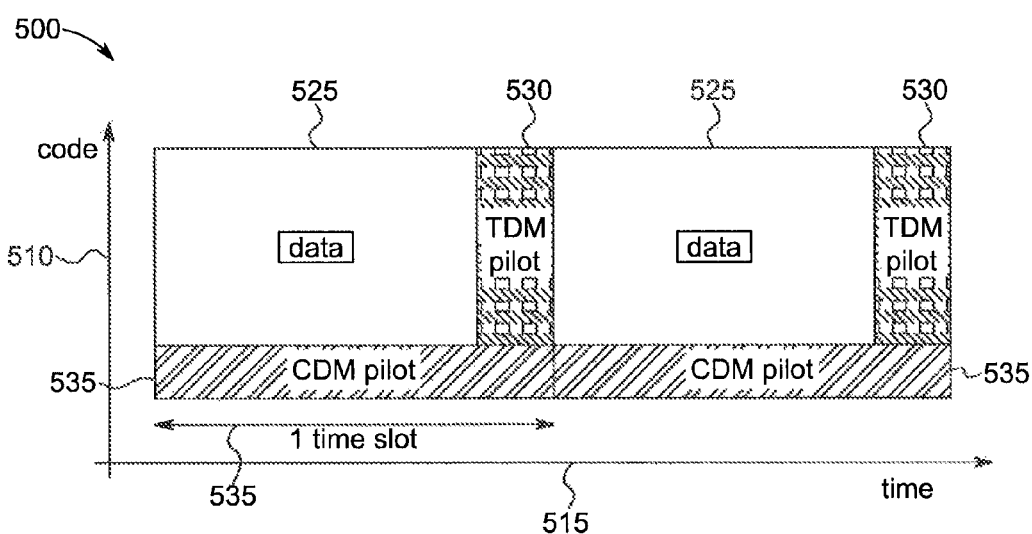
FIG. 5 illustrates data transmission using a combination of CDM and TDM pilots in accordance with some embodiments of the invention.

Embodiments of the invention provide a data transmission 500 that combines a CDM pilot waveform 535 and a TDM pilot waveform 530 that overlap in time, as shown in FIG. 5. The data transmission 500 is illustrated as a representation of channelisation codes 510 versus time 515. Here, the data 525 and TDM pilot sequence 530 share the same channelisation codes, with the CDM pilot 535 (for example on a CPICH) utilising a different set of channelisation codes. Together, the data 525, TDM pilot sequence 530 and CDM pilot 535 form a composite sequence signal.

In some embodiments of the invention, the TDM pilot 530 may or may not be orthogonal in code to the CDM pilot 535, although in some applications there may be some advantages in provision of this orthogonal property. Data 525 is transmitted in units of a time slot 520, in which a CDM pilot 535 and a TDM pilot 530 instance are contained. In general the construction of the CDM pilot waveforms 535 and TDM pilot waveforms 530 may vary from time slot 520 to time slot 520.

In some embodiments of the invention, the structure of the CDM pilot waveform 535 may be a predetermined sequence and associated with an operation of legacy channel estimation designs. In such embodiments, the TDM pilot waveform 530 may be a new sequence that is constructed to provide special properties of the resultant combined waveform that enhance channel estimation and receiver performance. Furthermore, in some embodiments, the resultant combined waveform may enable the use of efficient channel estimation algorithms at the receiver even in the presence of the legacy CDM pilot channel.

For example, in some embodiments the special properties of the resultant combined waveform, during the TDM pilot transmission period, may include:

(i) A cyclic nature of the signal construction, thereby enabling a use of computationally-efficient FFT-based channel estimation algorithms; or (ii) Low noise degradation factor (NDF) of the resultant combined signal, thereby enabling high quality estimation of the radio propagation channel to be performed (as described later).

It is known that the above-mentioned properties are desirable attributes of a pilot signal. However, it has been recognised by the inventor that the presence of a simultaneously-transmitted CDM pilot and also of any scrambling applied to the composite signal (including the TDM pilot) may have the potential to destroy the above-mentioned desirable properties. There is no known mechanism that teaches ways to construct TDM pilot sequences that preserve the above properties, whilst counteracting any potential action of a coexisting CDM pilot (which may not have been designed with the same optimisations in mind).

Additionally, it may be the case that, for legacy reasons, the resultant composite signal (including the TDM pilot 530) may be subject to a scrambling sequence that is similarly applied to the data and to the CDM pilot 535. Scrambling is typically applied to distinguish signals from differing transmitters or cells. If applied to the time region of the transmission of the TDM pilot 530, such scrambling sequences have the potential to destroy the desirable TDM pilot properties, including the cyclic property. Thus, the inventor has also recognised that there is no known technique whereby the desirable TDM pilot properties mentioned above may be preserved, even in the presence of such scrambling of the composite signal.

Thus, further embodiments of the invention have been developed to provide new ways by which the desirable properties of the TDM pilot sequence may be preserved, even in the presence of a scrambling sequence that is applied to the composite signal. Thereby, embodiments of the invention may circumvent one or more disadvantages associated with the present art where a TDM pilot is to be transmitted together with a CDM pilot for a digital transmission scheme.

It will be understood that in some embodiments the length of the TDM pilot sequence 530 in FIG. 5 will be a power of '2', e.g. 64, 128, 256, 512. Longer lengths may be desirable depending on the application. Selecting a sequence of such a length enables efficient channel estimation through the use of, but not limited to, the Discrete Fourier Transform (DFT) or Fast Fourier Transform (FFT).

Some embodiments of the invention conform to the general signal pattern description and construction of FIG. 5. Furthermore, some embodiments provide that the CDM pilot may be a pseudo-random binary or quaternary random sequence, such as that used by CPICH in the 3GPP wideband code division multiple access (WCDMA) universal mobile telecommunication system (UMTS) frequency division duplex (FDD) system. Such a waveform is not designed to exhibit periodic properties over the duration of the TDM pilot region, and hence may present an obstacle to retention of this desirable periodic property.

The CPICH in the 3GPP WCDMA UMTS FDD system is constructed by modulating one code from a set of orthogonal channelization spreading codes with a known sequence. Both the spreading code that is modulated, and the sequence used, are known a-priori to the receiver. Data and/or other signals (such as for example a code portion of a TDM pilot) are multiplexed together in the code domain and the resultant composite signal is subject to a scrambling operation as shown in FIG. 6.

Figure 6:
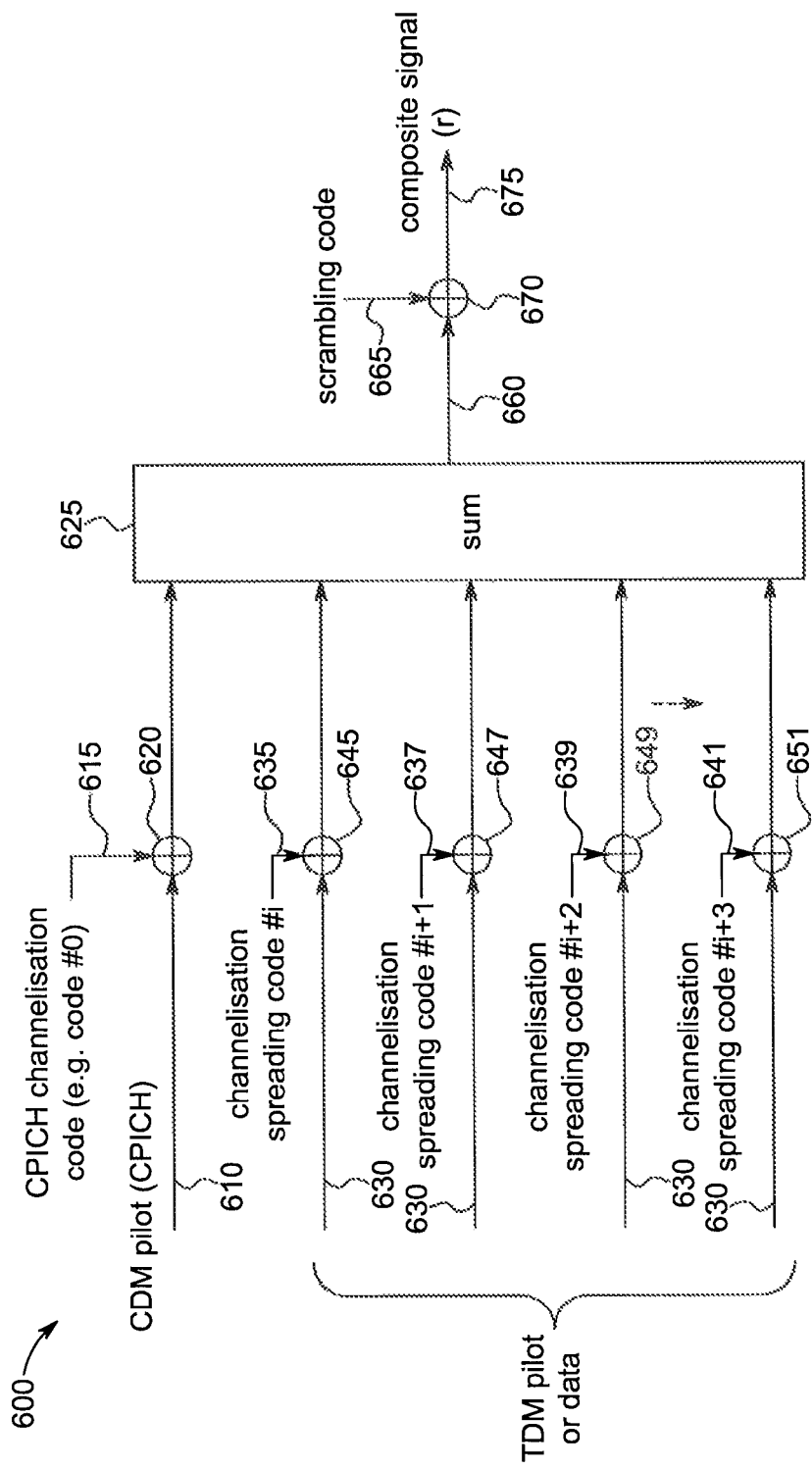
FIG. 6 illustrates a CDMA signal construction using spreading, code multiplexing and scrambling in accordance with some embodiments of the invention.

Referring now to FIG. 6, a CDMA signal construction 600 using spreading, code multiplexing and scrambling is illustrated in accordance with some embodiments of the invention. Here, a CDM pilot signal, for example in a form of a CPICH signal, 610 is multiplied with a (CPICH) channelisation code 615 in multiplier logic 620. Similarly, a plurality of TDM pilot signals or data 630 are multiplied with a respective channelisation code 635, 637, 639, 641 in respective multiplier logic units 645, 647, 649, 651. The outputs from each of the multiplier logic units 620, 645, 647, 649, 651 are combined in summing logic 625 to produce a constructed CDMA signal with spreading and code multiplexing 660. The constructed CDMA signal with spreading and code multiplexing 660 is then multiplied with a scrambling code 665 in multiplier logic 670 to produce composite signal 675, as illustrated.

In some embodiments, this scrambling code/sequence 665 may be in accordance with the cell-specific scrambling codes used in the 3GPP WCDMA UMTS system. Such a specific scrambling waveform is not designed to exhibit periodic properties over the duration of the TDM pilot region, and therefore may present an obstacle to retention of this desirable periodic property.

Thus, in some embodiments of the invention, a code portion of a TDM pilot signal may be used such that the scrambled overall combination of the code portion of the TDM pilot with the CDM pilot exhibits a cyclic property. By arranging that the scrambled overall combination of the code portion of the TDM pilot and CDM pilot exhibits a cyclic property, the use of computationally-efficient FFT-based channel estimation algorithms may be employed.

Figure 7:
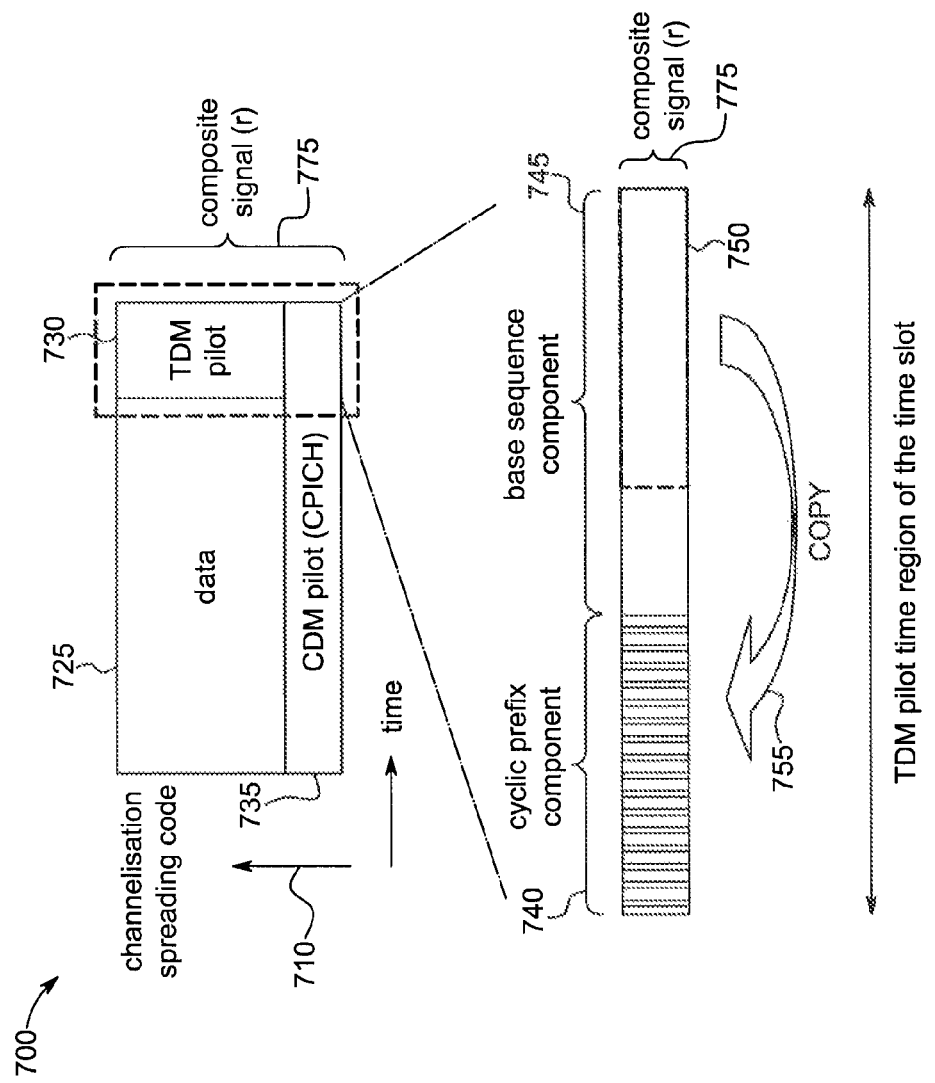
FIG. 7 illustrates an example of a cyclic construction of a composite signal in a TDM pilot time region in accordance with one embodiment of the invention.

Referring now to FIG. 7, an example of a cyclic construction 700 of a composite sequence signal 775, for a TDM pilot time region, is illustrated in accordance with one embodiment of the invention. The composite sequence signal 775 is illustrated first as a representation of channelisation spreading codes 710 versus time. Here, the data 725 and TDM pilot sequence 730 share the same channelisation spreading codes, with the CDM pilot 735 (for example on a CPICH) utilising a different set of channelisation spreading codes. Together, the data 725, TDM pilot sequence 730 and CDM pilot 735 form the composite sequence signal 775.

The composite sequence signal 775 is illustrated secondly as a time domain representation, whereby the composite sequence signal 775 comprises a base sequence component 745 and a cyclic prefix component 740. The cyclic prefix component 740 constitutes a replicated 755 portion 750 of the base sequence component 745. In one embodiment, the duration of the cyclic prefix component 740 may be intentionally aligned with the delay spread (dispersion) associated with the radio propagation channel. In one embodiment, the duration of the cyclic prefix component 740 may also occur such that the cyclic prefix component 740 has the same duration as the base sequence component 745.

In particular, the use of a cyclic structure for a pilot signal may allow for the use of an efficient and high performance decorrelating channel estimation process. Such a scheme may correspond to a maximum likelihood estimation of the amplitude and phase characteristics of the radio propagation channel.

For example, in the receiver, the preferred filter to estimate the impulse response h(t) of the radio channel may be a filter that corresponds to the signal processing inverse of the pilot time domain sequence p(t), wherein 't' represents a time index. When p(t) has a cyclic structure (incorporating the cyclic prefix component concatenated with the base sequence component), the application of the preferred inverse filter within the channel estimation processing may be implemented in the frequency domain via a simple vector division operation. In order to implement the inverse filter in a computationally efficient manner, a portion of the received signal may be first transformed into the frequency domain using a Discrete Fourier Transform (DFT) or a Fast Fourier Transform (FFT), to produce a frequency domain vector representation of the received signal portion, denoted R(f) wherein T denotes a frequency index. The inverse filter may then be applied by performing a simple element-by-element division operation on R(f). The divisor involved in this element-by-element division operation may be a vector $B_{inv}(f)$ that may be formed by performing a DFT or FFT operation on the time-domain pilot base sequence b(t). This computationally efficient inverse filtering process to produce a high quality channel estimate is only possible if the pilot sequence p(t) is cyclic comprising a concatenation of a base sequence b(t) with a pre-pended cyclic prefix component itself also formed from a portion of b(t).

Sequences that are optimised for channel estimation often exhibit low noise degradation factor (NDF). Effectively, this translates to a condition whereby the power spectral density (PSD) of the sequence (formed via Fourier analysis or similar) is approximately flat in amplitude. Thus, in an embodiment where an inverse filter structure is applied in the receiver to assist with channel estimation, there is little enhancement of any noise present on the signal and performance is improved when compared to a case where the sequence exhibits a power spectral density that is not flat in amplitude.

Thus, the use of 'spectrally-flat' pilot sequences are known in the art to be a desirable attribute to achieve good channel estimation and receiver performance.

The cyclic prefix component 740 of the pilot is not normally directly used in the channel estimation process due to the fact that this portion will typically experience time dispersed interference from preceding data. Instead, the received portion of the signal during the base sequence component region 745 is normally used as the input to the channel estimation process. Due to the presence of the cyclic prefix component 740, the received signal portion 750 during the base sequence component 745 is cyclic in structure, and is thus well suited to low-complexity channel estimation algorithms that utilise FFT-based processing techniques.

The composite signal during the TDM pilot region may be contaminated by a presence of a CDM pilot, which is non-cyclic in structure. Furthermore, the composite signal during the TDM pilot region may be scrambled by a non-cyclic scrambling sequence.

Therefore, in order to preserve the desirable cyclic sequence property of the combined signal, the TDM pilot sequence is designed to specifically counteract the effect of the non-cyclic CDM pilot and of any non-cyclic scrambling. Furthermore, this is achieved using signals that when combined with the CDM pilot, exhibit a low noise degradation factor for the resultant composite signal.

It will be understood that the non-cyclic CDM pilot and the non-cyclic scrambling may only be non-cyclic over a finite range of time. In one embodiment, a radio frame of 10 msec is subdivided into slots of length 10 msec./15 msec. In this embodiment, each slot contains a TDM pilot. The duration of the CDM pilot and scrambling sequences may be equal to one radio frame and are therefore cyclic at a period equal to the radio frame length of 10 msec. The CDM pilot and scrambling sequences are not necessarily cyclic over a time period shorter than the radio frame duration. It may therefore be the case that the TDM pilot is also cyclic at a period equal to the radio frame length of 10 msec., although this may not be the case at the slot length of 10 msec/15 msec, since a unique TDM pilot is required on each slot to preserve the desirable properties of the combined signal.

Figure 8:
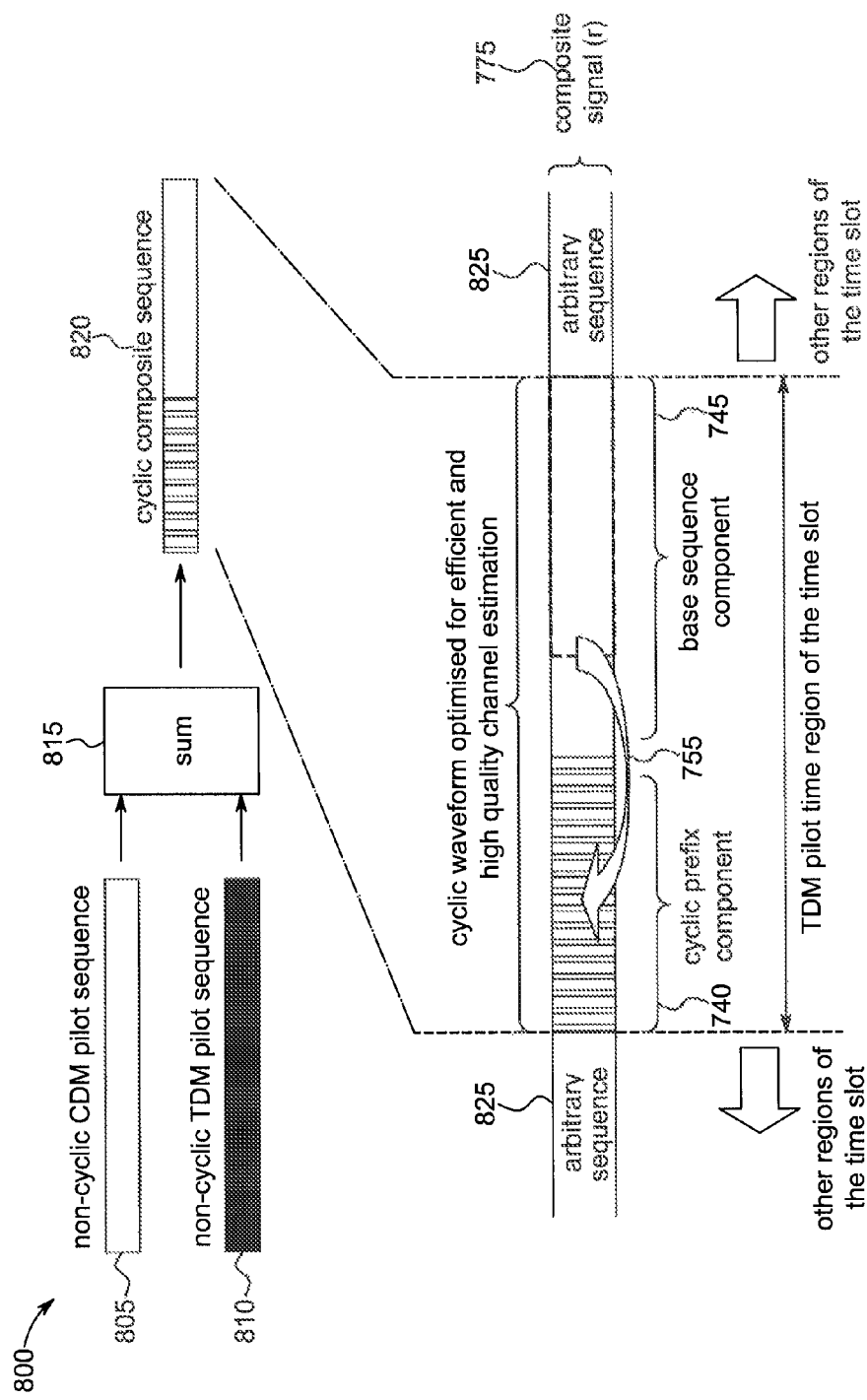
FIG. 8 illustrates an example of a creation of a cyclic pilot signal region using a non-cyclic CDM pilot sequence and a non-cyclic TDM pilot sequence in accordance with one embodiment of the invention.

Referring now to FIG. 8, an example 800 of a creation of a cyclic TDM pilot region using a non-cyclic CDM pilot sequence 805 and a non-cyclic TDM pilot sequence 810 is illustrated in accordance with embodiments of the invention. The non-cyclic CDM pilot sequence 805 and a non-cyclic TDM pilot sequence 810 are combined in summing logic 815 to produce a cyclic composite sequence 820. Thus, the composite signal 775 is formed from a cyclic composite sequence 820 enveloped by arbitrary sequences 825. Again, the cyclic composite sequence signal 820 comprises a base sequence component 745 and a cyclic prefix component 740. The cyclic prefix component 740 constitutes a replicated 755 portion 750 of the base sequence component 745.

Figure 9:
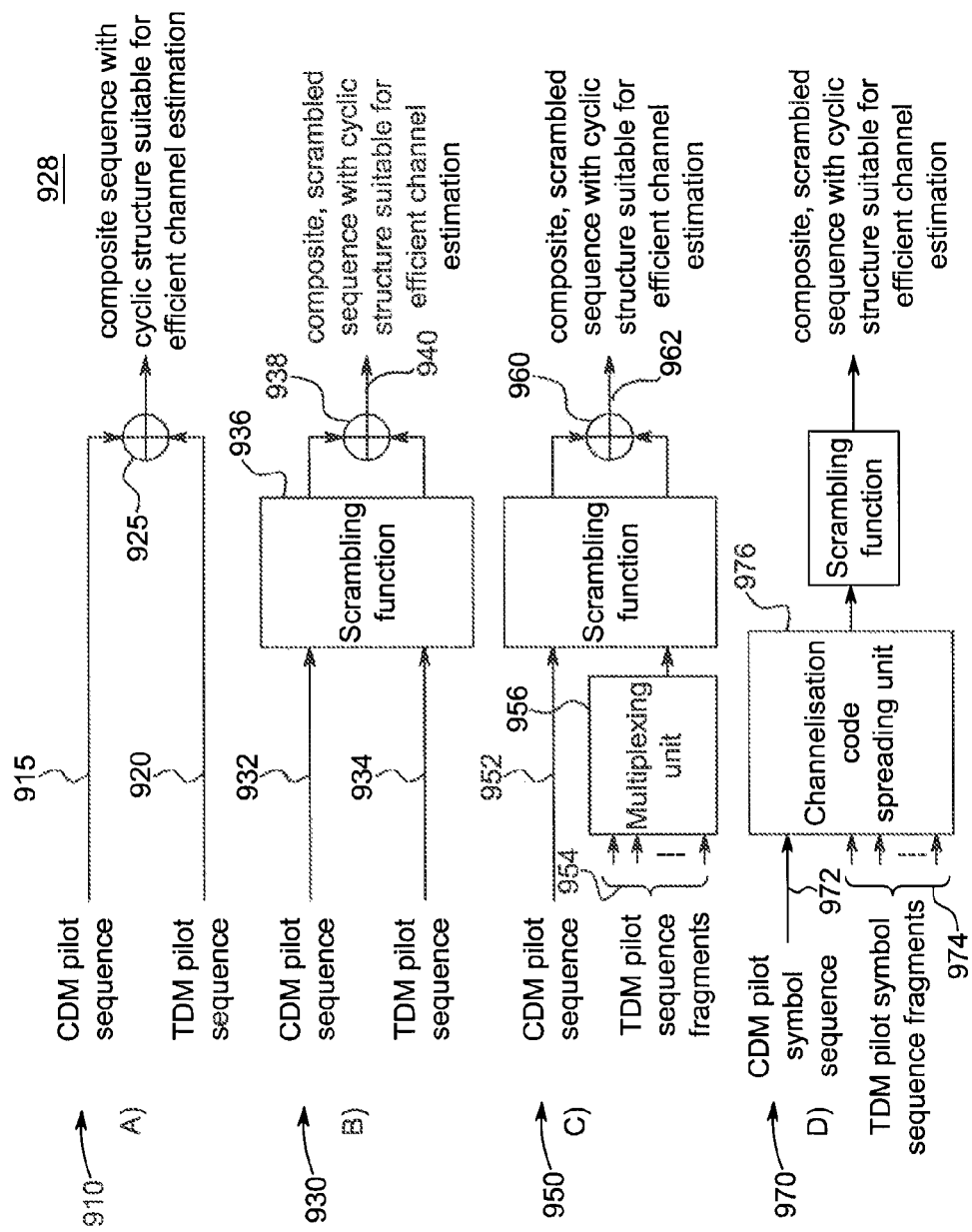
FIG. 9 illustrates examples of CDM and TDM pilot construction methods in accordance with one embodiment of the invention.

Referring now to FIG. 9, examples of CDM and TDM pilot construction methods are illustrated, according to some embodiments of the invention. A skilled artisan will appreciate that the exact generation of the CDM and TDM pilot sequences may involve one or more signal processing steps that is/are not explicitly shown in FIG. 9, and thus FIG. 9 provides a potentially simplified version of what may be implemented in practice.

With reference to a first embodiment 910 illustrated in FIG. 9A, a predefined and generally non-cyclic CDM pilot sequence 915 may be applied to summing logic 925. The CDM pilot sequence 915 may correspond to a scrambling sequence assigned to the transmitter or cell or to some other scrambling sequence. The scrambling sequence is generally non-cyclic in nature and is compatible with channel estimation methods used within legacy terminal designs. The CDM pilot sequence 925 is summed together with a TDM pilot sequence 920 in summing logic 925 in order to produce a composite sequence 928 that exhibits a cyclic property suitable for improved channel estimation and for its computationally efficient implementation (for example using Fast Fourier Transform (FFT)-based algorithms).

In a second embodiment 930 illustrated in FIG. 9B, a scrambling function may be implemented, for example using scrambling logic 936, where the scrambling codes are associated with all signals transmitted by the Node-B transmitter (or similar network element in the communication cell). A CDM pilot sequence 932 is input to the scrambling logic 936. The same scrambling function is also applied to a TDM pilot sequence 934. The two outputs from the scrambling logic 936 (corresponding to the scrambled CDM pilot and to the scrambled TDM pilot respectively) are summed in summing logic 938 in order to produce a composite sequence 940 that exhibits a cyclic property suitable for improved channel estimation and for its computationally efficient implementation (for example using FFT-based algorithms).

A third embodiment 950 illustrated in FIG. 9C is similar to that of FIG. 9B, with the exception that the TDM pilot sequence is constructed using a combination of several constituent sequence fragments 954. The fragments 954 are encoded and multiplexed into a single signal stream by multiplexing logic 956. A variety of multiplexing logic modules 956 may be applied and used as appropriate for specific circumstances. For example, the multiplexing logic 956 may consist of a frequency multiplexer such as a Discrete Fourier Transform (DFT) or a Fast Fourier Transform (FFT). Alternatively, the multiplexing logic 956 may consist of a channelization code spreading unit and code multiplexer similar to that shown in FIG. 6. In general the TDM sequence fragments 954 could each be used to modulate one of a set of orthogonal basis functions, such as complex exponentials (in the case of a DFT/FFT implementation) or channelization codes (in a spreading and code multiplexer implementation). Hence, any set of orthogonal functions may be employed within the multiplexing logic 956. The two outputs from the scrambling logic 952 (corresponding to the scrambled CDM pilot and to the scrambled, multiplexed TDM pilot sequence fragments respectively) are summed in summing logic 960 in order to produce a composite sequence 962 that exhibits a cyclic property suitable for improved channel estimation and for its computationally efficient implementation (for example using FFT-based algorithms). It is also envisaged in alternative embodiments that a use of non-orthogonal functions may also be possible.

A fourth embodiment 970 illustrated in FIG. 9D, is similar to that of FIG. 9C, with the exception that the multiplexing logic used to combine the TDM pilot sequence fragments comprises a spreading and code multiplexing logic 976 as typically used for data transmission in 3GPP WCDMA. Thus, by constructing the TDM pilot sequence using a set of TDM pilot symbol sequence fragments 974 in this manner allows for generation of the TDM pilot sequence using the same signal processing steps that are used for existing CDMA data transmission. In this way, the impact of the introduction of a TDM pilot on legacy CDM-based hardware and software implementations and architectures may be reduced.

The steps of data signal transmission are not explicitly shown in FIG. 9. According to the art known in 3GPP WCDMA, the data portion of the signal may be constructed to be code-division multiplexed with the CDM pilot using orthogonal variable spreading factor (OVSF) codes as shown in FIG. 6. The data bits are modulated onto data symbols, which may take the form of a finite alphabet of symbols. Such modulation schemes are well known and comprise for example BPSK, QPSK, 8-PSK, 16-QAM, or 64-QAM. The data portion of the signal is typically transmitted during a time portion of the time slot that does not overlap with the TDM pilot region of the time slot, as is evident from FIG. 7.

In general, it is envisaged in other embodiments that the TDM pilot sequence does not need to conform to a construction using OVSF (or other predefined) spreading codes, nor to a particular finite alphabet of modulation symbols.

However, it may be desirable in some embodiments to construct the TDM pilot sequence using OVSF codes and/or using symbols from a finite alphabet, such that it may be compatible with the same data transmit modulation architecture of the transmitter hardware. The use of a finite alphabet of symbols, and of a particular construction method for the TDM pilot sequence, represents a variety of signal or sequence constraints, commonly known as quantisation.

It will also be appreciated that other quantisation methods may also be applied to the TDM pilot sequence or to its associated sequence fragments. It is envisaged that these may include, for example, constant-amplitude signal construction with arbitrary (unconstrained phase), phase shift keying modulation (8-PSK, 16-PSK, 32-PSK), and arbitrary quadrature amplitude modulation such as 64-QAM or 256-QAM.

At a receiver, various channel estimation and data recovery techniques may be employed. In some embodiments there may exist either a CDM channel estimator component, or a TDM channel estimator component. In some embodiments, both a CDM and a TDM channel estimator component may be used, in combination, to improve the accuracy and quality of the channel estimate.

Thus, in one embodiment, the CDM channel estimator component may be arranged to analyse a structure of the received composite signal during the timeslot in order to search for a presence of the CDM pilot sequence, (such as for example, the CPICH in 3GPP WCDMA systems). The CDM channel estimator component may then generate a first estimate of the radio channel parameters.

The TDM channel estimator component may analyse a structure of the received composite signal during the TDM pilot region of the timeslot, in order to search for a presence of the TDM pilot sequence only. Alternatively, in one embodiment, the TDM channel estimator component may search for a presence of a composite sequence during the same time region. Advantageously, when the composite signal exhibits a cyclically-prefixed structure, such as that shown in FIG. 9, computationally-efficient structures may be employed in order to return a second estimate of the radio channel parameters. Such computationally-efficient methods may include, for example, the use of DFT or FFT transforms that rely upon the cyclic structure of the received signal during the TDM pilot region.

In yet further embodiments, it is also envisaged that data may be recovered using only the first or the second estimates of the radio channel. Optionally, the first estimate may be combined with the second estimate in order to form a combined estimate, which may improve the quality of the channel estimation and may improve the performance of the radio link.

Figure 10:
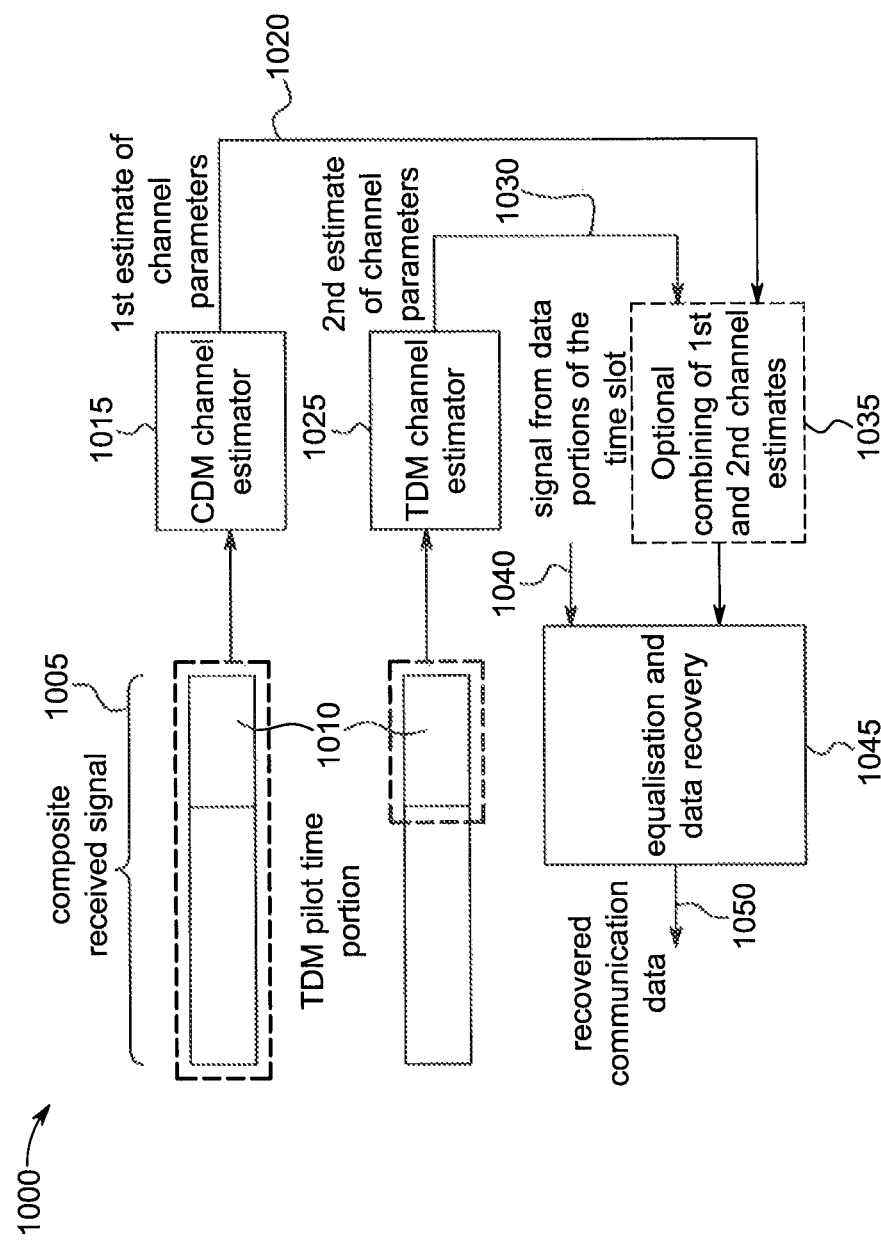
FIG. 10 illustrates an example of a receiver processing operation (steps) using combined CDM and TDM pilot signals in accordance with one embodiment of the invention.

Referring now to FIG. 10, an example of a receiver architecture 1000, adapted to employ a combined pilot signal transmission scheme, is illustrated and comprises logic arranged to receive composite received signals 1005.

The composite received signals 1005 comprise at least a TDM pilot portion 1010, as described previously. A first composite received signal 1005 is input to a CDM channel estimator 1015, which outputs a first estimate of channel parameters 1020. A second composite received signal 1005 is input to a separate TDM channel estimator 1025, which outputs a second estimate of channel parameters 1030. As illustrated in the example receiver architecture 1000, CDM-derived channel estimates 1020 and/or TDM-derived channel estimates 1030 may be used in subsequent signal processing steps within the receiver.

For example, as illustrated, the CDM-derived channel estimates 1020 and/or TDM-derived channel estimates 1030 may be combined in combining logic 1035 and input to equalisation and data recovery logic 1045. The equalisation and data recovery logic 1045 also receives signals from the data portion of the received time slot 1040 and outputs the recovered communication data 1050. In this manner, the CDM-derived channel estimates 1020 and/or TDM-derived channel estimates 1030 may be used to combat any effect of time dispersion within the radio propagation channel, using suitable equalisation structures arranged in equalisation and data recovery logic 1045, as are well known in the art and thus not described further here.

In a further example embodiment, it is also envisaged that the CDM pilot sequences and/or TOM pilot sequences may be used within the receiver to train equaliser structures that combat the effects of time dispersion within the radio channel, notably without involving an explicit channel estimation stage. An example of such an adaptive equaliser architecture 1100 is illustrated in FIG. 11.

Figure 11:
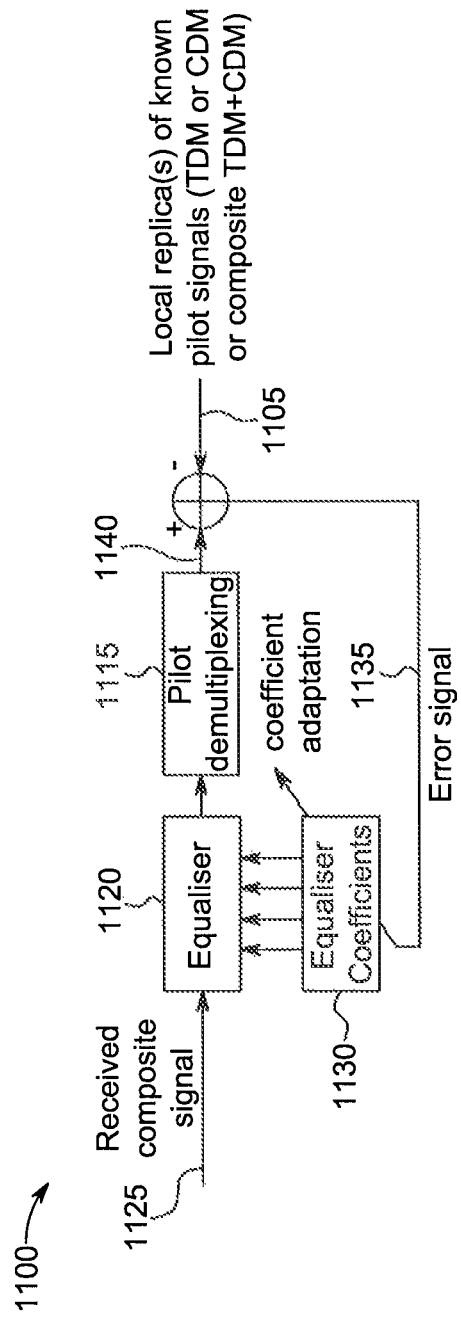
FIG. 11 illustrates examples of embodiments of the invention when applied to adaptive equalizer architectures.

As illustrated in the adaptive equaliser architecture 1100 of FIG. 11, a local replica of the known transmitted pilot sequences 1105 is compared with an equalised pilot signal 1140 output from an adaptive equaliser 1120. The adaptive equaliser 1120 receives a composite received signal 1125. The received pilots are extracted from the composite equalised output using the pilot demultiplexing logic 1115. The resultant error 1135 between the local replica 1105 and the equalised pilot 1140 is used to intelligently adjust the coefficients 1130 used within the equaliser structure for use in a subsequent time period. Thus, it is envisaged that such adaptive equaliser structures may also use a TDM pilot component or CDM pilot component (or combination of both a TDM pilot and CDM pilot) as an input to the adaptation process.

The above-mentioned embodiments of the invention describe how a specially-designed TDM pilot sequence may be superimposed onto a non-cyclic portion of a CDM pilot signal, in order to produce a composite sequence with desirable cyclic properties.

It is envisaged that many TDM pilot sequences may be used to achieve this goal. However, for anything other than very short sequence lengths, the number of possible sequences to search becomes quickly unmanageable. For example, even if the number of possible TDM pilot sequence is constrained to the simplest possible (i.e. binary) symbol alphabet, there are $2^{128}=3.4\times10^{38}$ possible sequences to search. For non-binary symbol alphabets, this rapidly increases to a much larger set of possible sequences.

As previously mentioned, it is also important that the base sequence of the TDM pilot has relatively flat frequency content, in order to maintain a low NDF when channel estimation is performed using a decorrelating channel estimator. Therefore, an intelligent sequence search process may be advantageously employed, in order to find sequences from a potentially very large set of possible sequences that also satisfy the low NDF criterion.

Figure 12:
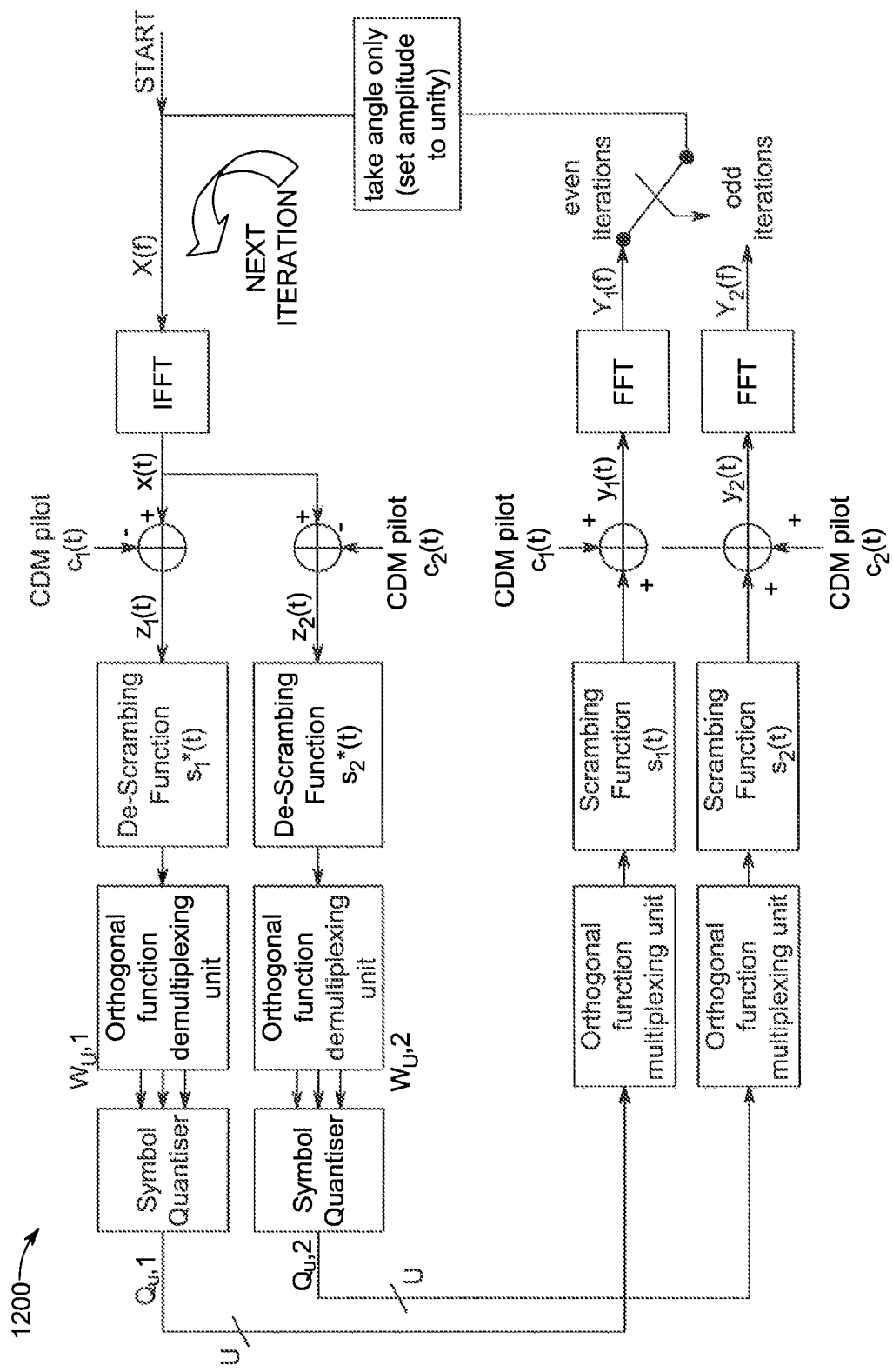
FIG. 12 illustrates an example of a sequence search process employed in some embodiments of the invention.

Referring now to FIG. 12, an example of a sequence search process 1200 that may be employed in some embodiments of the invention is illustrated. For example, the sequence search process 1200 is described for a scenario whereby the cyclic prefix duration of the combined pilot sequence is equal to the base sequence duration. The length of the base sequence is denoted as 'L' (thus the length of the cyclic prefix duration is also equal to 'L').

The search process 1200 is an iterative process. Referring to FIG. 12, li starts by randomly constructing a desired flat frequency domain content X(f) wherein 'f' is a frequency index 1 . . . L (this would satisfy the low NDF requirement). Note that the term 'flat' implies that the powers of a signal within each sub-band of a frequency range are approximately equal. An inverse fourier transform (e.g. IFFT) is performed on this desired output X(f) in order to derive the time domain sequence x(t) (also of length L) that would result in the flat frequency domain content of X(f).

If the overall pilot sequence is cyclic, comprising a base sequence of length L and a cyclic prefix also of length L, then the desired time domain signal for the total pilot signal is the concatenation of x(t) with itself.

For a scrambled non-cyclic CDM pilot component c(t) of length 2L, this may be considered as the concatenation of two different scrambled CDM pilot sequences $c_1(t)$ and $c_2(t)$, each of length L.

The signal x(t) of length L therefore comprises the summation of the ideal first half of the scrambled TDM pilot sequence $z_1(t)$ with the first half of the non-cyclic scrambled CDM pilot sequence $c_1(t)$, or equivalently the summation of the ideal second half of the scrambled TDM pilot sequence $z_2(t)$ with the second half of the non-cyclic scrambled CDM pilot sequence $c_2(t)$. Thus, $z_1(t)$ can be derived as $x(t)-c_1(t)$ and $z_2(t)$ can be derived as $x(t)-c_2(t)$.

In this example, let us consider that the TDM pilot sequence halves $z_1(t)$ and $z_2(t)$ are each constructed using a modulated and scrambled set of OVSF channelisation codes as shown in FIG. 9D. Each channelisation code is modulated using a TDM sequence 'fragment', again as shown in FIG. 9D. In order to derive the TDM pilot sequence fragments, the signals $z_1(t)$ and $z_2(t)$ are first descrambled by the transmitter-specific scrambling sequences for each half $s_1(t)$ and $s_2(t)$, and are optionally then demultipexed into their constituent orthogonal function components using a demultiplexing logic unit. The outputs of the two demultiplexing logic units are denoted $w_{u,1}$ and $w_{u,2}$ for the $u^{th}$ orthogonal basis function (u=1 . . . U) and for the $1^{st}$ and $2^{nd}$ signal halves respectively (corresponding to the cyclic prefix and base sequence halves of the signal). For each of the two branches, the set of U outputs are then quantised to a particular symbol alphabet to form $Q_{u,1}$ and $Q_{u,2}$.

The demultiplexing logic units may, in general, be constructed as a bank of filters each matched to an individual member of the set of U orthogonal functions. In the context of the example corresponding to FIG. 9D, the demultiplexing logic unit may consist of a set of CDMA channelisation code matched filters. If the TDM pilot sequence is not comprised of a combination of orthogonal basis functions, the demultiplexing stage may be omitted.

Following the symbol quantisation stage, the signal deconstruction portion of the iteration is complete. The signals for each of the two branches may then be reconstructed following the same (but inverse) signal processing steps to derive two reconstructed time domain signals $y_1(t)$ and $y_2(t)$, each of length L. A DFT or FFT of $y_1(t)$ and $y_2(t)$ is taken in order to evaluate the frequency domain content of the derived signals, producing $Y_1(f)$ and $Y_2(f)$. On, say, even iterations, the angle of the signal $Y_1(t)$ may be taken (with its amplitude set to unity) and may be used as the seed $X(f)$ for the next iteration. On odd iterations, for example, the angle of the signal $Y_2(t)$ may be taken (again with its amplitude set to unity) and may be used as the seed $X(f)$ for the next iteration.

This process may be repeated until $y_1(t)$ and $y_2(t)$ converge to the same (or a similar) sequence. When this is achieved, the overall composite pilot sequence formed from the concatenation of $y_1(t)$ with $y_2(t)$ and of length 2L is approximately cyclic (thus, the base sequence component and cyclic prefix component are constructed from a common sequence). This composite sequence is formed using the derived TDM pilot sequence fragments $Q_{u,1}$ and $Q_{u,2}$ for the cyclic prefix component and the base sequence component respectively. $Q_{u,1}$ and $Q_{u,2}$ are generally not the same but form similar sequences when scrambled with their respective scrambling sequence portions ($s_1(t)$ and $s_2(t)$) and when subsequently combined with their respective CDM pilot portions $c_1(t)$ and $c_2(t)$. The signals $y_1(t)$ and $y_2(t)$ may be nominally the same and both should exhibit the desired low noise degradation property (i.e. they have relatively 'flat' frequency domain content).

Figure 13:
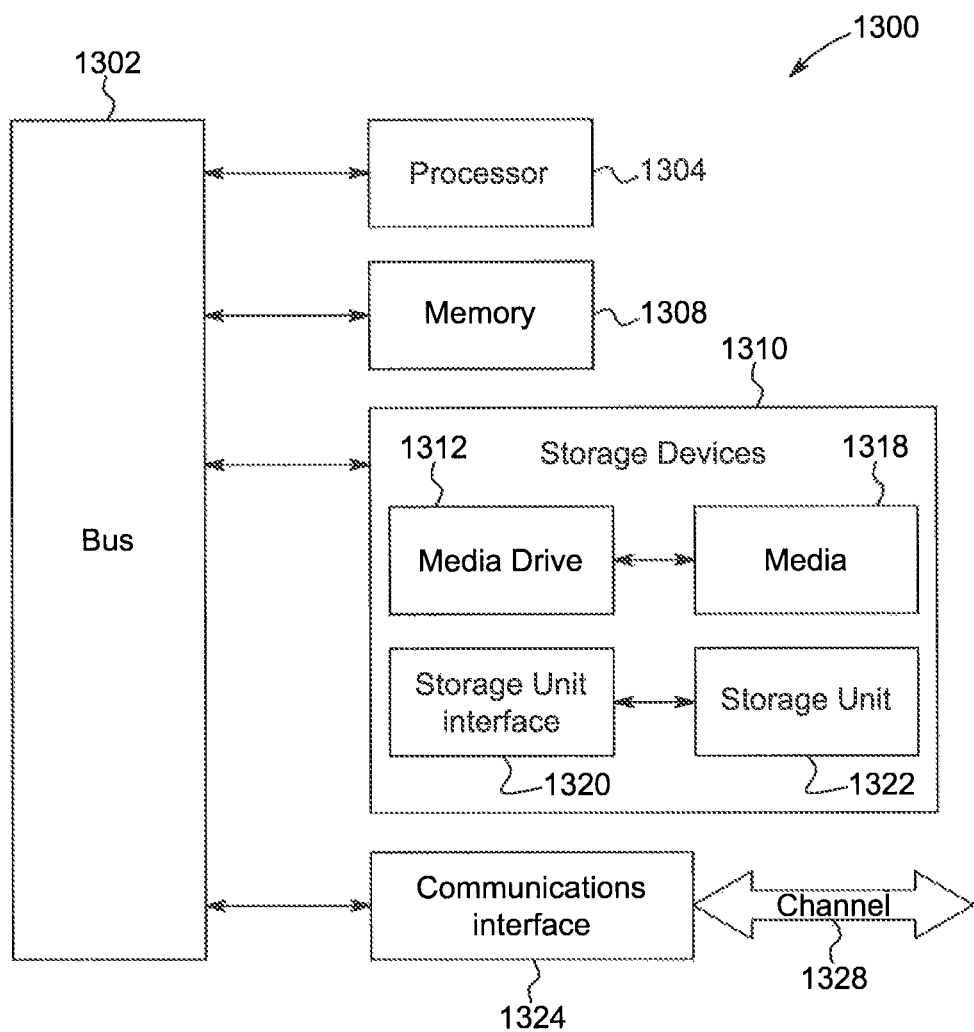
FIG. 13 illustrates a typical computing system that may be employed to implement signal processing functionality in embodiments of the invention.

Referring now to FIG. 13, there is illustrated a typical computing system 1300 that may be employed to implement signal processing functionality in embodiments of the invention. Computing systems of this type may be used in access points and wireless communication units. Those skilled in the relevant art will also recognize how to implement the invention using other computer systems or architectures. Computing system 1300 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1300 can include one or more processors, such as a processor 1304. Processor 1304 can be implemented using a general or special-purpose processing engine such as, for example, a microprocessor, microcontroller or other control logic. In this example, processor 1304 is connected to a bus 1302 or other communications medium.

Computing system 1300 can also include a main memory 1308, such as random access memory (RAM) or other dynamic memory, for storing information and instructions to be executed by processor 1304. Main memory 1308 also may be used for storing temporary variables or other intermediate information during execution of instructions to be executed by processor 1304. Computing system 1300 may likewise include a read only memory (ROM) or other static storage device coupled to bus 1302 for storing static information and instructions for processor 1304.

The computing system 1300 may also include information storage system 1310, which may include, for example, a media drive 1312 and a removable storage interface 1320. The media drive 1312 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1318 may include, for example, a hard disk, floppy disk, magnetic tape, optical disk, CD or DVD, or other fixed or removable medium that is read by and written to by media drive 1312. As these examples illustrate, the storage media 1318 may include a computer-readable storage medium having particular computer software or data stored therein.

In alternative embodiments, information storage system 1310 may include other similar components for allowing computer programs or other instructions or data to be loaded into computing system 1300. Such components may include, for example, a removable storage unit 1322 and an interface 1320, such as a program cartridge and cartridge interface, a removable memory (for example, a flash memory or other removable memory module) and memory slot, and other removable storage units 1322 and interfaces 1320 that allow software and data to be transferred from the removable storage unit 1318 to computing system 1300. Computing system 1300 can also include a communications interface 1324.

Communications interface 1324 can be used to allow software and data to be transferred between computing system 1300 and external devices. Examples of communications interface 1324 can include a modem, a network interface (such as an Ethernet or other NIC card), a communications port (such as for example, a universal serial bus (USB) port), a PCMCIA slot and card, etc. Software and data transferred via communications interface 1324 are in the form of signals which can be electronic, electromagnetic, and optical or other signals capable of being received by communications interface 1324. These signals are provided to communications interface 1324 via a channel 1328. This channel 1328 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1308, storage device 1318, or storage unit 1322. These and other forms of computer-readable media may store one or more instructions for use by processor 1304, to cause the processor to perform specified operations. Such instructions, generally referred to as 'computer program code' (which may be grouped in the form of computer programs or other groupings), when executed, enable the computing system 1300 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1300 using, for example, removable storage drive 1322, drive 1312 or communications interface 1324. The control logic (in this example, software instructions or computer program code), when executed by the processor 1304, causes the processor 1304 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

The invention claimed is:

1. A method performed by a base station (BS), the method comprising:
   generating, by the BS, a first pilot sequence, wherein the first pilot sequence is a code division multiplexing (CDM) pilot sequence and is spread with a first channelization code;
   generating, by the BS, a second pilot sequence, wherein the second pilot sequence is a plurality of time division multiplexing (TDM) pilot sequences including a cyclic prefix and is spread with a second channelization code;
   performing, by the BS, a scrambling operation on the first pilot sequence and the second pilot sequence during substantially overlapping plurality of time slots;
   transmitting, by the BS, data, the first pilot sequence and the second pilot sequence during the substantially overlapping plurality of time slots as a composite signal,
   wherein the composite signal is within a designated or pre-defined time region such that the first pilot sequence has non-cyclic properties over the designated or pre-defined time region;
   wherein the second pilot sequence is composed such that the composite signal has a cyclic prefix time domain structure within the designated or pre-defined time region; and
   wherein the cyclic prefix includes a replicated portion of a base portion of the composite signal.

2. The method of claim 1 further comprising:
   modulating, by the BS, the composite signal using a finite symbol alphabet or constant-amplitude symbols.

3. The method of claim 1, wherein the first pilot sequence is a portion of a common pilot channel of a third generation partnership project (3GPP) wideband code division multiple access (WCDMA) universal mobile telecommunication standard (UMTS) system.

4. The method of claim 1, wherein the first pilot sequence or the second pilot sequence enables a wireless communication unit to demodulate a data symbol.

5. A base station (BS) comprising:
   a processor configured to generate a first pilot sequence, wherein the first pilot sequence is a code division multiplexing (CDM) pilot sequence and is spread with a first channelization code;
   the processor further configured to generate a second pilot sequence, wherein the second pilot sequence is a plurality of time division multiplexing (TDM) pilot sequences including a cyclic prefix and is spread with a second channelization code;
   the processor further configured to perform a scrambling operation on the first pilot sequence and the second pilot sequence during substantially overlapping plurality of time slots;
   a transmitter configured to transmit, data, the first pilot sequence and the second pilot sequence during the substantially overlapping plurality of time slots as a composite signal,
   wherein the composite signal is within a designated or pre-defined time region such that the first pilot sequence has non-cyclic properties over the designated or pre-defined time region;
   wherein the second pilot sequence is composed such that the composite signal has a cyclic prefix time domain structure within the designated or pre-defined time region; and
   wherein the cyclic prefix includes a replicated portion of a base portion of the composite signal.

6. The BS of claim 5 further comprising:
   the processor further configured to modulate the composite signal using a finite symbol alphabet or constant-amplitude symbols.

7. The BS of claim 5, wherein the first pilot sequence is a portion of a common pilot channel of a third generation partnership project (3GPP) wideband code division multiple access (WCDMA) universal mobile telecommunication standard (UMTS) system.

8. The BS of claim 5, wherein the first pilot sequence or the second pilot sequence enables a wireless communication unit to demodulate a data symbol.

9. A method performed by a wireless communication unit, the method comprising:
   receiving, by the wireless communications unit on substantially overlapping plurality of time slots, a composite signal, wherein the composite signal includes data symbols, a first pilot sequence, wherein the first pilot sequence is a code division multiplexing (CDM) pilot sequence and is spread with a first channelization code, and a second pilot sequence, wherein the second pilot sequence is a plurality of time division multiplexing (TDM) pilot sequences including a cyclic prefix and is spread with a second channelization code;

wherein the composite signal is received within a designated or pre-defined time region such that the first pilot sequence has non-cyclic properties over the designated or pre-defined time region;

wherein the second pilot sequence is composed such that the composite signal has a cyclic prefix time domain structure within the designated or pre-defined time region;

wherein the cyclic prefix includes a replicated portion of a base portion of the composite signal;

descrambling, by the wireless communication unit, the composite signal with a non-cyclic scrambling code; and demodulating, by the wireless communications unit, the composite signal to recover the data symbols based on the first pilot sequence or the second pilot sequence.

10. The method of claim 9, wherein the first pilot sequence is a portion of a common pilot channel of a third generation partnership project (3GPP) wideband code division multiple access (WCDMA) universal mobile telecommunication standard (UMTS) system.

11. A wireless communications unit comprising:

a receiver configured to receive, on substantially overlapping plurality of time slots, a composite signal, wherein the composite signal includes data symbols, a first pilot sequence, wherein the first pilot sequence is a code division multiplexing (CDM) pilot sequence and is spread with a first channelization code, and a second pilot sequence, wherein the second pilot sequence is a plurality of time division multiplexing (TDM) pilot sequences including a cyclic prefix and is spread with a second channelization code;

wherein the composite signal is received within a designated or pre-defined time region such that the first pilot sequence has non-cyclic properties over the designated or pre-defined time region;

wherein the second pilot sequence is composed such that the composite signal has a cyclic prefix time domain structure within the designated or pre-defined time region;

wherein the cyclic prefix includes a replicated portion of a base portion of the composite signal;

a processor configured to descramble the composite signal with a non-cyclic scrambling code; and the processor configured to demodulate the composite signal to recover the data symbols based on the first pilot sequence or the second pilot sequence.

12. The wireless communications unit of claim 11, wherein the first pilot sequence is a portion of a common pilot channel of a third generation partnership project (3GPP) wideband code division multiple access (WCDMA) universal mobile telecommunication standard (UMTS) system.

* * * * *